(12) United States Patent
Vilenskii et al.

(10) Patent No.: US 10,445,556 B2
(45) Date of Patent: Oct. 15, 2019

(54) OPTICAL SYSTEM FOR BIOMETRIC IDENTIFICATION OF A USER

(71) Applicant: SAMSUNG ELECTRONICS CO., LTD., Suwon-si (KR)

(72) Inventors: Maksim Alexeevich Vilenskii, Moscow (RU); Mikhail Vyacheslavovich Popov, Moscow region (RU); Aleksei Andreevich Gavron, Moscow region (RU)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 15/434,707

(22) Filed: Feb. 16, 2017

(65) Prior Publication Data

US 2018/0018492 A1 Jan. 18, 2018

(30) Foreign Application Priority Data

Jul. 18, 2016 (RU) .................................. 2016129245

(51) Int. Cl.
*G06K 9/00* (2006.01)
(52) U.S. Cl.
CPC ........... *G06K 9/001* (2013.01); *G06K 9/0004* (2013.01); *G06K 9/00107* (2013.01); *G06K 2009/00939* (2013.01)
(58) Field of Classification Search
CPC ... G06K 9/001; G06K 9/0004; G06K 9/00107
See application file for complete search history.

(56) References Cited

U.S. PATENT DOCUMENTS

| 5,077,803 | A | * | 12/1991 | Kato | .................... | A61B 5/1172 356/71 |
| 5,986,746 | A | * | 11/1999 | Metz | .................... | A61B 5/1172 356/71 |
| 7,505,613 | B2 | | 3/2009 | Russo | | |

(Continued)

FOREIGN PATENT DOCUMENTS

| EA | 199901109 A1 | 6/2000 |
| RU | 2 286 599 C2 | 10/2006 |
| RU | 2 373 573 C2 | 11/2009 |

OTHER PUBLICATIONS

Communication dated May 12, 2017 by the Russian Federal Service for Intellectual Property in counterpart Russian Patent Application No. 2016129245.

*Primary Examiner* — Ruiping Li
(74) *Attorney, Agent, or Firm* — Sughrue Mion, PLLC

(57) ABSTRACT

The present disclosure relates to the field of biometric identification of a user, in particular, to a system and method of identifying a user. The method of identifying a user includes: detecting a portion of a user's finger in contact with a touch-sensitive region of a device; and collecting data relating to a fingerprint of the user from the user's finger for a period of time and obtaining a plurality of frames from the data. The method further includes determining whether the user is an authorized user of the device, based on a ridge pattern, a sweat gland pattern, and dynamics of blood circulation in the user's finger as indicated by the data. The method provides an enhanced security system that can be integrated in a user's mobile device to protect against fake biometric characteristics in access control systems.

14 Claims, 6 Drawing Sheets

(56) References Cited

U.S. PATENT DOCUMENTS

| | | |
|---|---|---|
| 7,817,256 B2 | 10/2010 | Fujii et al. |
| 8,229,185 B2 * | 7/2012 | Ennis ................. G06K 9/00046 340/5.53 |
| 8,520,911 B2 | 8/2013 | Fenrich et al. |
| 8,538,095 B2 | 9/2013 | Fedele et al. |
| 2016/0283773 A1 * | 9/2016 | Popovich ........... G02B 26/0808 |
| 2016/0287144 A1 * | 10/2016 | Iwaguchi ........... G06K 9/00033 |

* cited by examiner

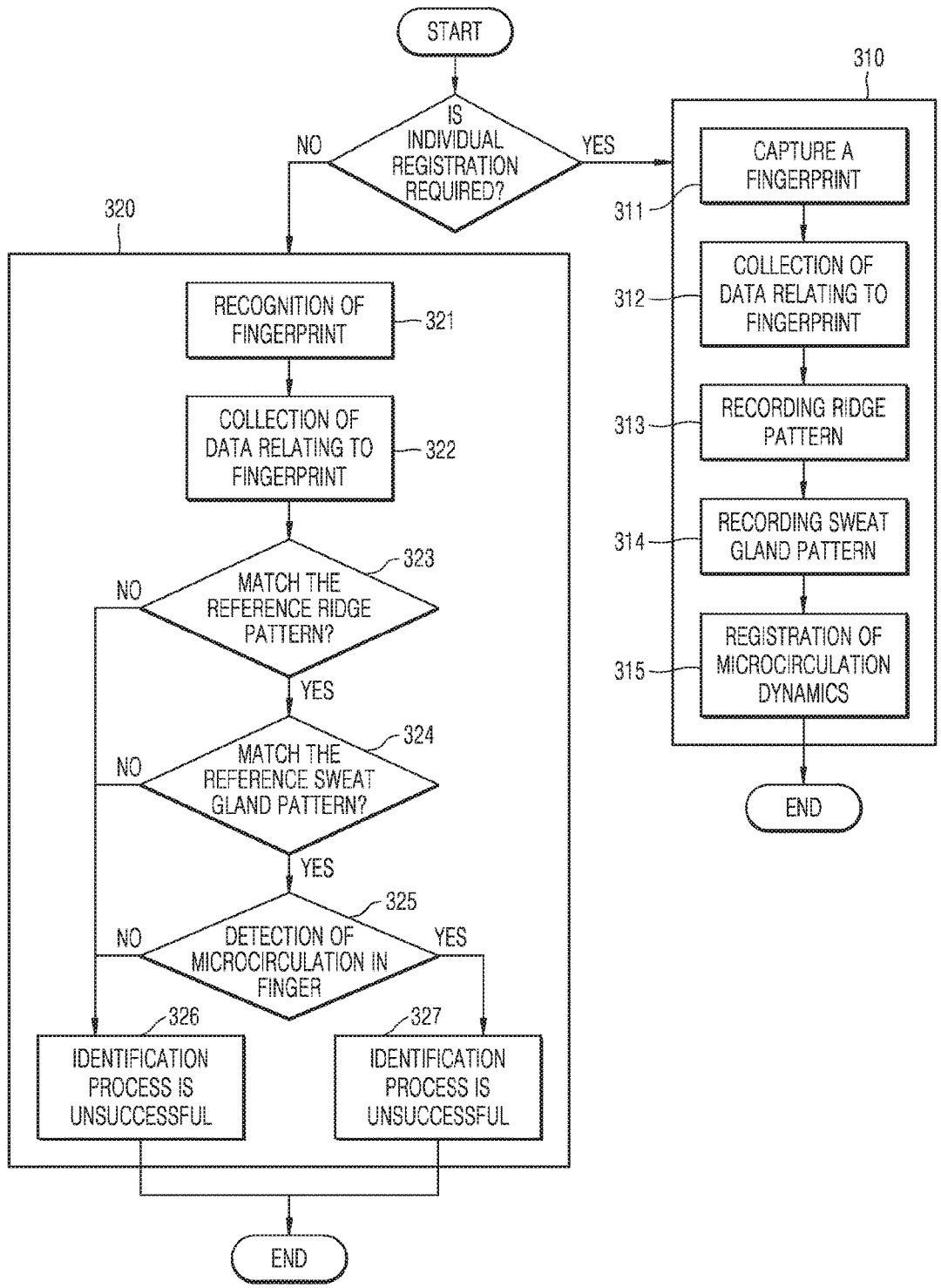

OPTICAL SYSTEM FOR BIOMETRIC IDENTIFICATION OF A USER

The application claims priority from Russian Patent No. 2016129245, filed on Jul. 18, 2016 in Russian Federal Service for Intellectual Property, the disclosure of which are incorporated herein in its entirety by reference.

BACKGROUND OF THE DISCLOSURE

Field of the Disclosure

The present disclosure relates to the field of biometric identification of a user, in particular, to a system and method of identifying a user based on ridge patterns, sweat gland patterns and/or the presence of dynamic microcirculation of blood in a fingertip. The present disclosure can be applied to protect against the use of fake biometrics in access control systems.

Related Art

Personal identification using biometric technologies is currently one of promising and rapidly developing trends, and methods and means that use fingerprints rank first among such trends. Existing mobile devices use capacitive sensors for fingerprint recognition, which do not provide an adequate security level and are not ideal in protecting the devices against unauthorized access. Many studies have shown that such devices can be accessed using fake fingerprints made from playdough, gelatin, silicone, glue, etc. Such devices do not provide for anti-spoofing analysis, i.e. analysis for detection of fake biometric information (e.g., fake fingerprints).

Even if biometric devices use physiologic information to identify a user, these measurements rarely detect whether the physiologic information is obtained from a "live" finger of a user, i.e. whether the fingerprint is obtained from a living person. Therefore, there is a need for current mobile devices which utilize a user identification system having anti-spoofing analysis. Thus, one of the identification purposes is to determine whether the user's biometric data is acquired from a "live" finger.

The present disclosure increases access security and accuracy in user identification for devices with biometric identification when the user having access to the device uses detection and respective verification devices. According to the present disclosure, reconstruction of microcirculation of blood in the fingertip is utilized in user identification and anti-spoofing analysis. In reconstructing microcirculation, three main characteristics are extracted: a ridge pattern of a fingerprint, a sweat gland pattern, and dynamics of blood microcirculation in the fingertip.

This approach suggests implementing a fingerprint recognition system relying on optical methods not currently applied in mobile devices.

One of the solutions being known that disclose biometric identification systems using a fingerprint, is a solution disclosed, for example, in patent document U.S. Pat. No. 8,520,911 B2 ("Low power fingerprint capture system, apparatus, and method", Identification International, Inc.). The known solution teaches a user identification method using an optical system, and an apparatus for implementing the method. The apparatus uses the principle of total internal reflection of light (the apparatus comprises a light source, a prism, a camera and a computer or other control device to capture an image), and further employs a scanning apparatus to capture a fingerprint image. Prior art disclosures, such as those disclosed in U.S. Pat. No. 8,520,911 B2, do not provide for anti-spoofing analysis, so there is an opportunity to use a fake fingerprint. Such prior art disclosures do not mark sweat glands to obtain a sweat gland pattern as a further identification feature either to obtain a higher security level in identifying a user. Moreover, the prior art does not utilize a polarizing film to enhance quality of the resulting captured image, in which the polarizing film improves signal-to-noise ratio by filtering light reflected from the surface of a light scattering object such as a finger, as will be further disclosed in more detail. The inventions do not either employ speckle imaging to determine functional characteristics of blood flow, such as the velocity of particle flow and the spatial distribution of such velocities, which are required to detect blood microcirculation in the fingertip.

Patent document U.S. Pat. No. 8,538,095 B2 ("Method and apparatus for processing biometric images", Aprilis, Inc.) discloses a method and apparatus for processing biometric images. According to this solution, a light source provides a collimated or expanded beam of light. The light source generates one or more beams that are projected by an optical element and a holographic optical element (HOE) to reflect off a cover plate for imaging the features of the fingerprint. The light source may comprise a coherent source, such as a laser diode, which works efficiently with an HOE, or a non-incoherent source. Prior art solutions of this type do not use the analysis of speckle images to detect whether a "live" finger is used or a fake one. The solutions do not either provide for the use of a polarizing film, and thus a high quality image of the fingerprint features cannot be produced.

Furthermore, patent document U.S. Pat. No. 7,505,613 B2 ("System for and method of securing fingerprint biometric systems against fake-finger spoofing", Atrua Technologies, Inc.) discloses a system and method of providing biometric systems in order to prevent the use of fake fingerprints. The patent describes a spoof detection module which analyzes a fingerprint image, in particular, density of sweat pores, density of streaks, and pixels, in particular, variance of pixels corresponding to a fingerprint ridge and variance of pixels corresponding to a fingerprint valley, etc. However, this disclosure does not provide for analysis of dynamic microcirculation of blood in the fingertip, which is necessary to confirm that a "live" finger is in contact with the device. This is a significant disadvantage of the spoof detection module because a fake fingerprint (belonging to a non-living person or a fake finger) can be used to gain access to the device since it will be identified by the device. Moreover, this solution is not applicable in a mobile device.

Patent document U.S. Pat. No. 7,817,256 B2 ("Personal authentication method and personal authentication device utilizing finger-tip blood flow measurement by laser light", Fujii et al.) describes a personal authentication method and a device that utilizes fingertip blood flow measurement by laser light. In this method, a fingerprint pattern is obtained using blood flow information characteristic of a living body. The fingertip is irradiated with one laser beam at a specific wavelength or with a plurality of different laser beams at specific wavelengths at the same time or in sequence. Superimposed blood flow rate maps or a plurality of blood flow rate maps with respect to the reflected light are obtained. This solution does not provide for the use of a polarizing film either, which prevents achieving a high quality image of fingerprint features, and only two blood flow maps are captured, which cannot be sufficient to determine whether a red blood cell moves at least at one size of its body (10 μm). Furthermore, it is important that this solution is not applicable in a mobile device.

The object of the present disclosure is to provide a system and method of identifying a user, which offer the following improvements over existing solutions:

higher accuracy of user recognition, particularly, a ridge pattern, a sweat gland pattern and display blood microcirculation in the fingertip;

anti-spoofing analysis based on the following solutions: forming an image using light polarization to detect the effect of rotation of the plane of polarization after scattering the light on a living tissue; and subsequently analyzing the intensity fluctuations (determination of dynamic blood microcirculation in the fingertip) using speckle imaging;

reduced size of the identification system for improved integration with consumer mobile devices by means of the used lens system.

In addition, the present disclosure offers a further advantage. There is a small percentage of patients in the world who suffer from adermatoglyphia, a rare genetic disorder which causes a person to have no fingerprints (papillary pattern). Acquisition of a sweat gland pattern enables identification with respect to this group of people.

SUMMARY OF THE DISCLOSURE

The object is attained by a method and system that are defined in independent claims. Additional example embodiments of the present disclosure are presented in dependent claims.

The present disclosure involving a procedure of user registration and fingerprint capture provides an optical system for identification of a fingerprint, which uses physiological information to identify a user. The structure and method of the implementation allow integration of the user identification system into consumer mobile devices, but the present invention may also be applied to stationary devices.

In accordance with a first aspect of the present disclosure, an optical system for identifying a user, the optical system being integrated in a mobile device, includes: a radiation source; a waveguide configured to direct light emitted by the radiation source; a polarizing film; an optical image forming unit; a detector; and a processor. The optical image forming unit may comprise at least one lens configured to receive light exiting the waveguide and reflected from a light scattering object. The at least one lens focuses the received light onto a polarizing film.

Alternatively, the optical image forming unit includes: a lens system configured to receive light exiting the waveguide and reflected from a light scattering object adjacent to the waveguide, and the lens system focuses the received light onto the polarizing film and the light scattering object is a user's finger.

The polarizing film filters the received light and includes a cross-polarization part and a co-polarization part; and a detector having light-sensitive elements. Further, the polarizing film is disposed in front of the detector along a light path, the light-sensitive elements sense light transmitted by the polarization film and form an optical image on a surface of the detector based on the sensed light, and the detector is configured to convert the formed optical image into an electrical signal.

The electrical signal includes data relating to the light-scattering object and contains information on a ridge pattern, a sweat gland pattern, and/or dynamics of blood microcirculation in the finger.

The light scattering object may be a user's finger.

The processor is configured to process the electrical signal, and further, is configured to identify the user based on the data relating to the light-scattering object.

The processor is configured to compare the data relating to the light-scattering object with pre-stored data and determine, based on the comparison, whether the user is an authorized user of the device.

According to an example embodiment, the radiation source is a laser diode.

According to another example embodiment, the radiation source is a light emitting diode (LED).

The present optical system can also employ a plurality of waveguides. If the system comprises a single waveguide, the waveguide can further include a light absorber. The system may include a plurality of waveguides each including a light absorber. The waveguide includes a light absorber disposed on an end of the waveguide opposite to the radiation source.

According to one example embodiment, the lens system of the optical image forming unit includes at least one of a single lens, a set of lenses or an array of lenses.

In another example embodiment, the detector of the optical image forming unit is a CCD-array.

According to another example embodiment, the detector of the optical image forming unit is a CMOS-array.

The processor of the optical system can be an autonomous system. The processor, in turn, can be a FPGA (Field-Programmable Gate Array) based system or a custom integrated circuit based system. If necessary, the processor is a PC-based system, which can be a graphical processor (GPU), a cluster system, or a general purpose processor.

In accordance with a second aspect of the present disclosure, a method of identifying a user includes: detecting a portion of a user's finger in contact with a touch-sensitive region of a device; and collecting data relating to a fingerprint of the user from the user's finger for a period of time and obtaining a plurality of frames from the data, wherein the data includes a ridge pattern of the fingerprint, a sweat gland pattern of the fingerprint, and dynamics of blood circulation in the user's finger. The method further includes determining whether the user is an authorized user of the device. The determination includes: verifying whether a portion of the ridge pattern matches a portion of a pre-stored reference ridge pattern; upon verifying the portion of the ridge pattern matches the portion of the pre-stored reference ridge pattern, verifying whether the sweat gland pattern matches a pre-stored reference sweat gland pattern; upon verifying the sweat gland pattern matches the pre-stored reference sweat gland pattern, verifying from the plurality of frames whether blood is circulating in the finger; and upon verifying blood is circulating in the finger, identifying the user as an authorized user. The method further comprises identifying the user as an unauthorized user upon: determining a portion of the ridge pattern does not match a portion of the pre-stored reference ridge pattern, determining the sweat gland pattern does not match the pre-stored reference sweat gland pattern, or determining blood is not circulating in the finger.

It should be noted that if at least one of the steps of the user identification method is unsuccessful, the user is identified as an unauthorized user.

According to one example embodiment, the method further includes a user registration step including: capturing a full fingerprint of the user from the user's finger, wherein the capturing includes detecting a touch input in which the portion of the user's finger is in contact with a touch-sensitive region of the device, wherein the contact includes repeatedly pressing the portion of the user's finger on the touch-sensitive region or sliding the user's finger on the touch-sensitive region.

The method further includes collecting data relating to the full fingerprint for a period of time and obtaining a plurality of frames from the data related to the full fingerprint. The data related to the full fingerprint includes a ridge pattern of the full fingerprint, a sweat gland pattern of the full fingerprint, and dynamics of blood circulation in the user's finger. Further, the method includes recording and storing the ridge pattern of the full fingerprint as a pre-stored reference ridge pattern; recording and storing the sweat gland pattern of the full fingerprint as a pre-stored reference sweat gland pattern; and registering the user as an authorized user and assigning the dynamics of blood microcirculation in the user's finger to the user. The collection of data related to the fingerprint or the full fingerprint includes obtaining about at least 20 frames and preferably about 30 frames.

According to the example embodiments, the user touches a button using one of the user's fingers. The optical system for identifying a user according to the first aspect is disposed under the button.

Use of the inventive fingerprint sensor and method provides higher security level and accuracy for devices with biometric identification.

In respect of users suffering from adermatoglyphia, the method of identifying a user similarly includes verification steps, which, in verifying whether a portion of the ridge pattern matches a portion of a pre-stored reference ridge pattern, will be considered successful if information obtained on the ridge pattern indicates the absence of ridges, in the case that the method has previously identified the absence of ridges during registration of the user.

According to one example embodiment, a method of registering a user comprising: capturing a fingerprint of the user from the user's finger by detecting a touch input in which the portion of the user's finger is in contact with a touch-sensitive region of a device; collecting data relating to the fingerprint for a period of time and obtaining a plurality of frames from the data related to the fingerprint, wherein the data related to the fingerprint comprises a ridge pattern of the fingerprint, a sweat gland pattern of the fingerprint, and dynamics of blood circulation in the user's finger; storing the ridge pattern of the fingerprint as a pre-stored reference ridge pattern; storing the sweat gland pattern of the fingerprint as a pre-stored reference sweat gland pattern; registering the user as an authorized user and assigning the dynamics of blood circulation in the user's finger to the user is provided.

Preferably, the contact comprises repeatedly pressing the portion of the user's finger on the touch-sensitive region or sliding the user's finger on the touch-sensitive region.

Preferably, the collecting the data comprises obtaining at least 20 frames from the data.

The technical effect achieved through the application of the present invention comprises providing a system for identification of a living user by a ridge pattern, a sweat gland pattern and dynamic blood circulation in the finger, which is suitable for integration in consumer mobile devices and provides high accuracy of identification.

BRIEF DESCRIPTION OF THE DRAWINGS

These and other features and advantages of the present invention will become apparent upon reading the following description and viewing the accompanying drawings, in which:

FIG. 3 shows a flow chart of a user identification method in accordance with an example embodiment of the present disclosure.

DETAILED DESCRIPTION OF THE DISCLOSURE

Figure 1:
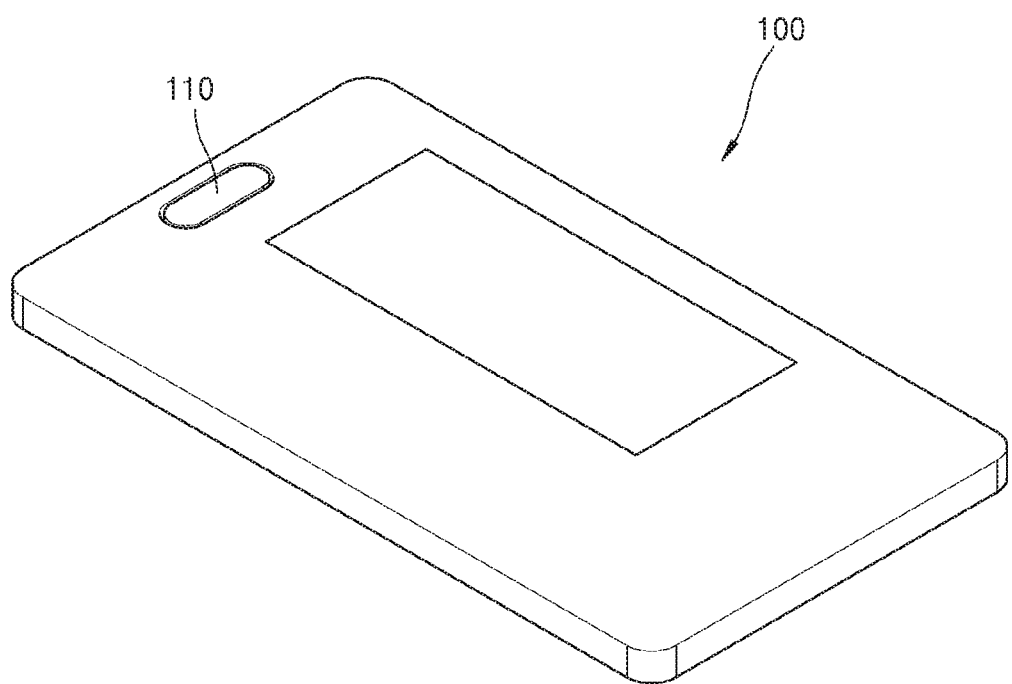
FIG. 1 illustrates an arrangement of a user identification system in a mobile device in accordance with a preferred example embodiment of the present disclosure.

Various example embodiments of the present disclosure will be further described in more detail with reference to the drawings. However, the present disclosure may be embodied in many other forms and should not be construed as limited to any specific structure or function presented in the following description. On the basis of the present description it will be appreciated by those skilled in the art that the scope of the present disclosure covers any example embodiment of the present disclosure disclosed in this document, regardless of whether it is implemented independently or in combination with any other example embodiment of the present disclosure. For example, the system may be implemented or the method may be practiced using any number of example embodiments described in this document. In addition, it should be appreciated that any example embodiment of the present disclosure disclosed in this document can be implemented using one or more elements of the claims.

The word "exemplary" or "example" is used herein to mean "serving as an example or illustration". Any example embodiment described herein as "example" should not be necessarily construed as preferred or having an advantage over other embodiments. The present disclosure relates to an optical system which provides anti-spoofing of user identification. A feature of the claimed disclosure is a method of speckle correlation video reflectometry for obtaining images of a finger pad pattern (ridges, valleys, sweat gland patterns, and microvasculature). The speckle correlation video reflectometry method has been chosen as the most suitable method for determining functional characteristics of blood flow (microcirculation in the fingertip), such as the velocity of particle flow and the spatial distribution of velocities of such particles. The relationship between the flow velocity of particles (red blood cells in blood plasma) and the speckle contrast field is governed by the Siegert relation (i.e., the speckle contrast field is inversely proportional to the displacement velocity of the scattering particles—red blood cells). The speckle correlation video reflectometry method is related to methods of dynamic light scattering. The speckle correlation video reflectometry method is based on the closeness of values of statistical moments of spatio-temporal intensity fluctuations of ergodic and statistically homogeneous speckle fields that are estimated by averaging ergodic and statistically homogeneous speckle fields in temporal and spatial areas, and involves estimation of the contrast of time-averaged dynamic speckles depending on exposure time when recording the speckle-modulated images: $V(T) = \delta I(T)/\langle I \rangle$, where $\langle I \rangle$, $\delta I(T)$ are the mean and root-mean-square values, respectively, of brightness fluctuations of a speckle-modulated image at a given exposure time, T. Analysis of local estimates of the contrast of speckle-modulated images of the object surface at a fixed exposure time according to zones covering a predetermined number of speckles allows visualization of regions that are significantly different in terms of mobility characteristics values of the scattering centers from the values averaged over the sensed region. The maximum sensitivity of the speckle correlation video reflectometry method to mobility variations of the dynamic scattering centers over the sensed region is achieved when the chosen exposure time corresponds to the maximum modulus value of the derivative $dV(T)/dT$.

As mentioned earlier, the present disclosure involves anti-spoofing analysis, which includes: forming an image after light polarization by recording the effect of rotation of the polarization plane after scattering light in a living tissue, and subsequently analyzing the fluctuations of intensity, i.e. determining dynamic blood circulation in the fingertip using speckle imaging. Thus, the system disclosed differentiates between a spoofing-image, e.g. an image generated from a fake fingerprint (e.g. a fingerprint made from play dough, gelatin, silicone, glue, etc., or a fingerprint belonging to a non-living person) and an image generated from a fingerprint generated from a finger connected to a living person (i.e., an image of a "live" finger).

FIG. 1 illustrates an arrangement of a user identification system 100 in a mobile device 110 in accordance with an example embodiment of the present disclosure. According to the example embodiment shown in FIG. 1, the user identification system 100, i.e. an optical system, may be disposed, for example, under the "Home" button of the mobile device 110. However, in example embodiments, the optical system may be placed under any touch-sensitive region of the mobile device screen.

Figure 2A:
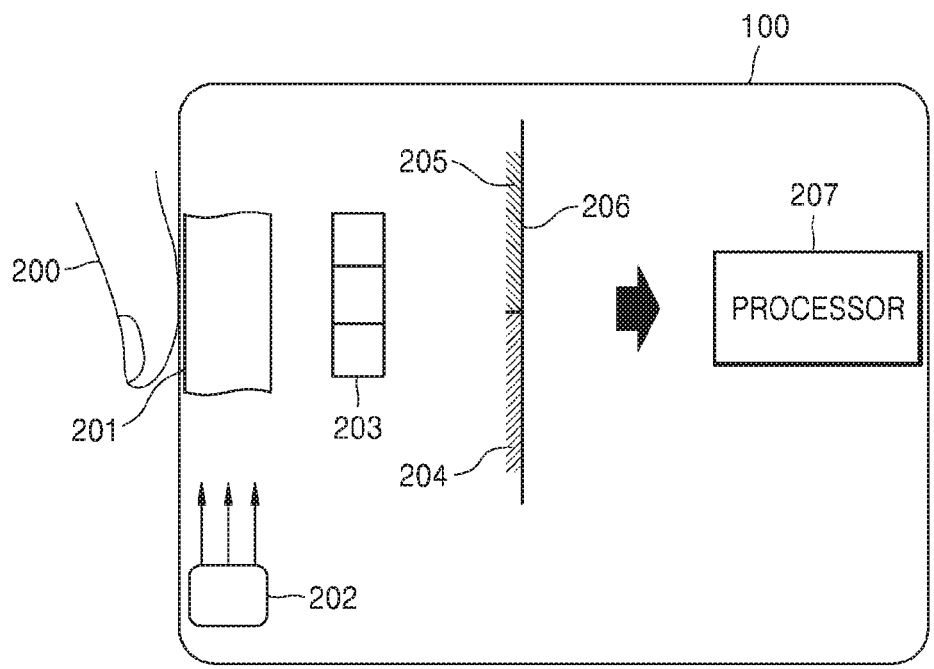
FIG. 2A illustrates a structure of a user identification system, which includes a radiation source, an array of lenses and a polarizing film in accordance with an example embodiment of the present disclosure.

Next, referring to FIG. 2A, the structure and operation of the user identification system 100 will be discussed. FIG. 2A shows a structure of the user identification system 100, which includes a radiation source 202, a waveguide 201, a lens array 203 and a polarizing film 204/205, in accordance with an example embodiment of the present disclosure. The radiation source 202 may be, for example, a laser diode. A user may be identified via the system 100, for example, by placing a finger 200 of the user on the region under which the waveguide 201 is disposed. Light emitted by the radiation source 202 produce speckles. Light emitted by the radiation source 202 is directed from an optically denser medium (waveguide material) to an optically less dense medium (air) at an angle which is greater than the critical angle for transmitting the light between two transparent (not absorbing light) media at a boundary therebetween. Thus, laser light incident at the boundary between these two media is totally reflected at the boundary due to the fact that the light is not refracted into the optically less dense medium, but is reflected by the optically less dense medium along the boundary between the two media. The above phenomenon of total internal reflection (TIR) is applied for directing light inside the waveguide 201 due to multiple total reflection of light by the waveguide (reflection coefficient is equal to 1). In places where the user's finger 200, for example, ridges on the surface of the user's finger 200, touch the waveguide (i.e. places where an "air-glass" boundary changes to a "ridge-glass" boundary) TIR will decrease or cease entirely. When the user's finger 200 (opaque medium) is in contact with a surface of the waveguide surface, the phenomenon of frustrated total internal reflection (FTIR) is observed at the surface, in particular, TIR at the surface is interrupted by a scattering object, i.e. the ridges on the surface of the user's finger 200, having a refractive index greater than the refractive index of the waveguide material. Thus, beginning at the boundary between the two media, i.e., the waveguide material and ridges of the user's finger 200, the TIR effect disappears, and radiation from the radiation source 202 is absorbed by a layer having a reflection index less than one and partially penetrated by a light wave. Further, the lens array 203 collects light reflected from the boundary between the waveguide medium and valleys between the finger ridges, and focuses the light on the polarizing film. The polarizing film includes two parts: a cross-polarized part 204 and a co-polarized part 205. Light reflected from the surface of the fingertip (the boundary) is filtered out by crossed polaroids of the polarizing film, whereas light reflected from the depths of the finger tissue is transmitted. Thus, polarization decreases, and the signal-to-noise ratio is improved by filtering the light reflected from the surface, thereby producing a higher quality image, which contributes to a more efficient differentiation between living and non-living tissue. The waveguide 201 guides light emitted from the radiation source such that the light is uniformly distributed over the entire surface of the finger. Lens array 203 refers to a two-dimensional structure consisting of lenses. The lens array 203 may be, for example, composed of at least one lens and can be a lens raster. The number of lenses included in the lens array 203 is not limited to that illustrated in FIG. 2A. By incorporating the lens array 203, the size of the sensor (user identification system 100) may be reduced, since the use of a lens array can simplify the choice of the sensor position in any mobile device. A detector 206 having light-sensitive elements (i.e. photosensitive elements), such as a light-sensitive array, e.g. CCD or CMOS, senses transmitted light (e.g., light emitted from the radiation source and guided by the waveguide 201, or light distributed over the entire surface of the finger). The detector 206 is disposed behind a polarizing film. The detector 206 converts an optical image projected thereon into an electrical signal and may transmit the electric signal to a processor 207. The lens array 203, the polarizing film 204/205 and the detector 206 form together an optical image forming unit. Data acquired from the electrical signal is processed by the processor 207 to extract data for user identification.

Instead of a laser diode, the radiation source 202 may be, for example, a light-emitting diode (LED). In this case, the absorbing properties of biological tissues are recorded as a known function of wavelength.

The processor 207 can be designed as an autonomous system, such as an FPGA (Field-Programmable Gate Array) based system or a custom IC-based system (developed according to customer's technical specifications). Also, the processor 207 may be a PC-based system, in particular, a graphic processor unit (GPU), a cluster system or a general-purpose processor.

Figure 2B:
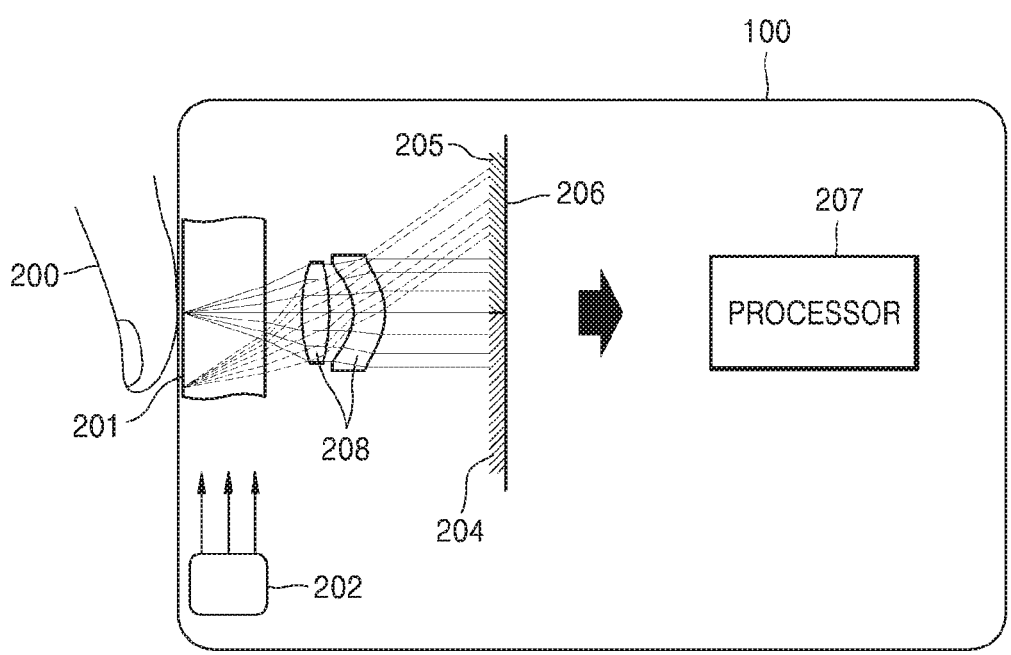
FIG. 2B illustrates a structure of a user identification system including a set of lenses for forming an image in accordance with an example embodiment of the present disclosure.

FIG. 2B shows a structure of a user identification system 100 including a set of lenses 208 for forming an image in accordance with an example embodiment of the present disclosure. With the structure shown in FIG. 2B, a user may be identified via the system 100 as in FIG. 2A. Light emitted by the radiation source 202 may produce speckles. The light is totally reflected by the waveguide 201 due to total internal reflection (TIR), and the reflection of the light is interrupted by a scattering object, i.e. the tip of the user's finger 200. In the set of lenses 208, lenses are arranged one behind the other, and any conventional optical system may be used in which any number of lenses are disposed along the same optical axis. Instead of the set of lenses 208, a single lens may be used. Light transmitted though the set of lenses 208 hits the polarizing film including two parts: a cross-polarized part 204 and a co-polarized part 205. Further, a detector 206 (CCD/CMOS) may detect light transmitted by the polarizing film and convert the same into an electrical signal. The light transmitted by the polarizing film may form an image, for example, a Fourier image representing a spatial Fourier spectrum. The electrical signal is processed by the processor 207.

Figure 2C:
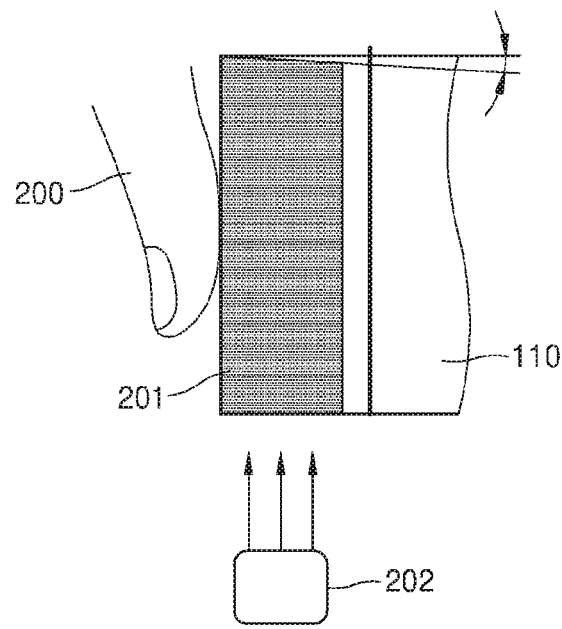
FIG. 2C shows a structure of a waveguide of a user identification system in accordance with an example embodiment of the present disclosure.

FIG. 2C shows a structure of the waveguide 201 of the user identification system 100 in accordance with an example embodiment of the present disclosure. In particular, FIG. 2C shows a user's finger 200 in contact with a button, for example, the "Home" button (not shown) of a mobile device 110, under which the waveguide 201 is disposed. The cross section of the waveguide 201 in this example embodiment is a rectangle or, for example, a substantially rectangular trapezoid. In the case in which the cross section is a substantially rectangular trapezoid, the radiation source 202 is disposed on the side of an end face of the waveguide 201 which forms substantially right angles with the long sides of the waveguide 201. The user's finger 200 contacts the long side of the waveguide 201, which is substantially under the "Home" button on the mobile device 110, and in the case in which the cross section is a substantially rectangular trapezoid, the long side is the side of the larger base thereof. In this example embodiment, a reflector may be disposed on the end face of the waveguide 201 such that the angle between the end face and the long side of the waveguide 201 is from 86.25°-90° and the angle between the end face and the short side of the waveguide 201 is from 90°-93.75°. In a preferred example embodiment, the angle between the end face and the long side of the waveguide 201 is 86.25° and the angle between the end face and the short side of the waveguide 201 is 93.75°. The reflector, as known, reduces the amount of light loss, thereby allowing for more efficient use of light flux by the waveguide 201 (compared to the combination of the waveguide 201 with a light absorber discussed hereinafter). Inclining the end wall/the reflector, and hence the values of the aforementioned angles, allows for optimal light reflection toward the user's finger 200 such that the reflected light is optimally distributed over the surface thereof. Therefore, in an example embodiment, the waveguide side opposite to the radiation source is disposed at an angle other than a right angle to the base, and thus the light reflected from the side with the reflector hits the user's finger 200 when contacting the button. Further, the light reflected from the boundary between the waveguide medium and the valleys between the finger ridges falls on the lens array 203, as described above in relation to FIG. 2A.

Figure 2D:
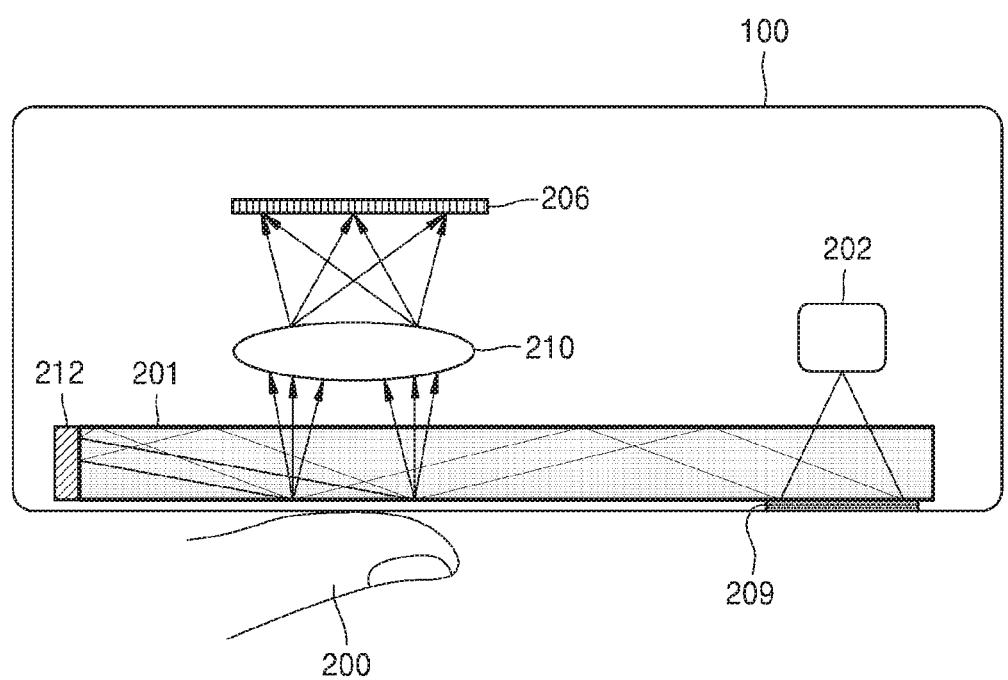
FIG. 2D shows a structure of a user identification system, which includes an HOE (an holographic optical element) in accordance with another example embodiment of the present disclosure.

If a rectangular waveguide is used, a light absorber may be further incorporated to control light scattering, thereby minimizing the amount of light falling on ridges at angles different from the TIR angles. This is attained due to the fact that, in a rectangular waveguide with a light absorber (unlike a waveguide with an inclined wall), beams reaching the end of the waveguide are partially absorbed by the light absorber. Use of a light absorber in the present optical system is disclosed in more detail with reference to FIGS. 2D, 2G and 2H below. FIG. 2D shows a structure of the user identification system 100 in accordance with another example embodiment of the present disclosure, which includes a holographic optical element (HOE). In this example embodiment, light from the radiation source 202 propagates through HOE 209. Holographic optical elements are designed to correct distortion of object images in optical systems. The HOE 209 is disposed on the surface of the waveguide 201 opposite the radiation source, as shown in FIG. 2D. The user identification system 100 further comprises a light absorber 212 disposed at an end of the waveguide 201 opposite to the end at which the radiation source 202 is disposed. The light absorber 212 absorbs a portion of the reflected light in the user identification system 100.

Figure 2E:
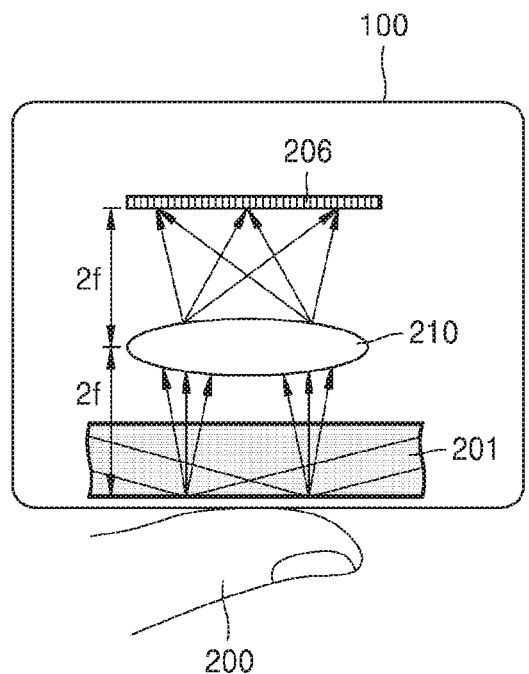
FIG. 2E illustrates an arrangement of a waveguide, a detector and a lens system in accordance with one example embodiment of the present disclosure.

FIG. 2E shows an arrangement of the waveguide 201, the detector 206 and the lens 210 relative to each other in the user identification system 100. Instead of the lens 210, a set 208 of lenses as disclosed previously may also be used. The distance between the surface of the waveguide 201 contacting the scattering object (e.g., the tip of the user's finger 200) and the lens 210 is equal to twice the focal distance f, and the distance between the lens 210 and the detector 206 is also equal to twice the focal distance f. The user identification system 100 as shown in FIG. 2E provides a real image of the fingerprint.

Figure 2F:
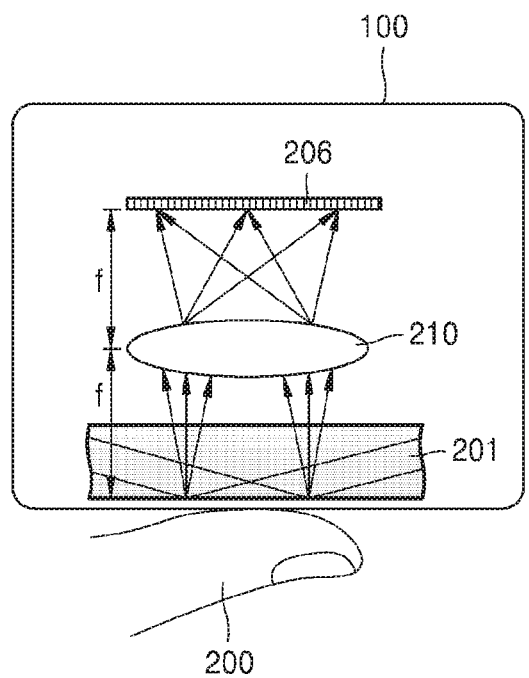
FIG. 2F illustrates an arrangement of a waveguide, a detector and a lens system in accordance with another example embodiment of the present disclosure.

FIG. 2F shows an arrangement of the waveguide 201, the detector 206 and the lens 210 in accordance with an example embodiment of the present disclosure. In this example embodiment, the lens 210 can be replaced by a set of lenses 208. According to this example embodiment, the distance between the surface of the waveguide 201 contacting the scattering object (e.g., the tip of the user's finger 200) and the lens 210 is equal to the focal distance f, and the distance between the lens 210 and the detector 206 is also equal to the focal distance f. It is known that in the focal plane of the lens (i.e. the plane passing through the focus of the lens and perpendicular to the optical axis of the lens), the intensity distribution (i.e. spectral decomposition of light waves) of the light incident on the lens has the shape of a spatial Fourier spectrum. Thus, the distance between the objects of the optical system is chosen equal to the focal length to provide the Fourier image (spectrum) of the fingerprint. The overall size of the user identification system 100 is minimized and may be more easily accommodated in a user's mobile device due to the arrangement of elements as shown in FIG. 2F. Then, using the inverse Fourier transform on the Fourier image (spectrum), a real image of the fingerprint can be obtained, from which a ridge pattern and a sweat gland pattern can be obtained, respectively. The presence of dynamics of blood microcirculation in the finger is determined based on the Fourier image analysis.

Figure 2G:
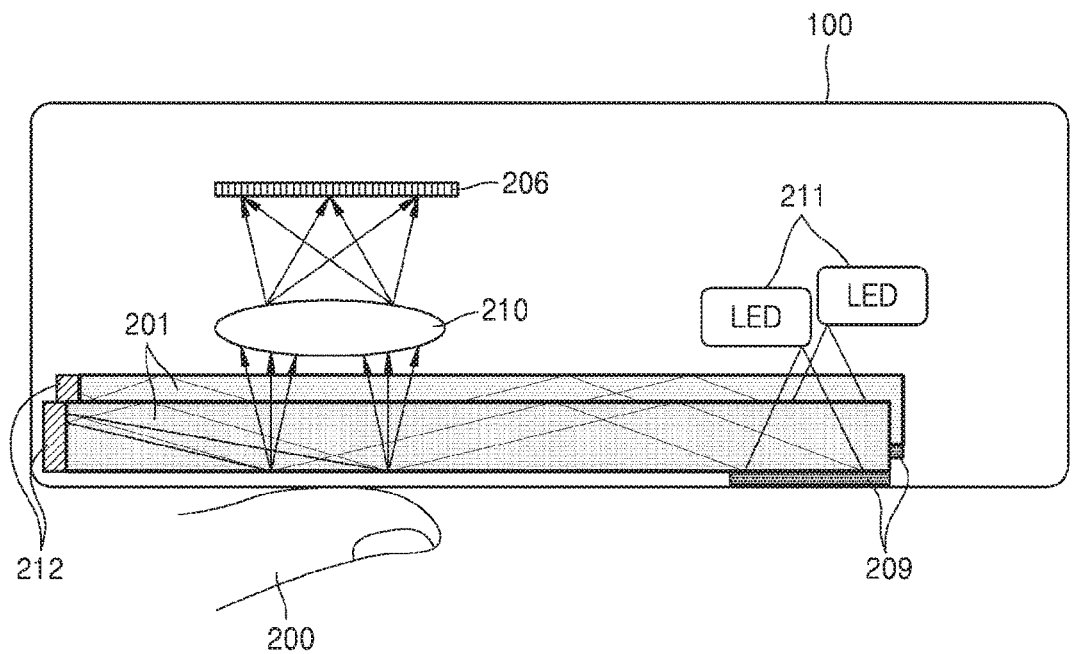
FIG. 2G illustrates a structure of a user identification system, in which base elements of the user identification system are duplicated to enable the use of two wavelengths in accordance with one example embodiment of the present disclosure.

FIG. 2G shows a structure of a user identification system 100 in accordance with an example embodiment of the present disclosure, in which base elements of the user identification system 100 illustrated in FIG. 2D are duplicated to enable the use of two wavelengths. According to this alternative example embodiment, the user identification system 100 includes two waveguides 201, two holographic optical elements (HOEs) 209, two radiation sources (LEDs 211), and two light absorbers 212. According to the example embodiments of the present disclosure, a plurality of these base elements can be used as well. Light emitted by the LEDs 211 and passing through the lens 210 (or, alternatively, set 208 of lenses) is similarly detected by the detector 206, which converts the same into an electrical signal. If a plurality of elements are used in the user identification system 100 as described above, a plurality of waveguides 201 are disposed in parallel to one another and completely cover a region defined by the "Home" Button. Holographic optical elements (HOEs), radiation sources, and light absorbers are each arranged, as described above, relative to a respective waveguide. By incorporating multiple elements as described above in which light having different wavelengths is transmitted from multiple radiation sources and detected by multiple detectors, differences between absorbing properties of tissue may be detected, and such differences may be used to differentiate a living object from a non-living one. Furthermore, the use of light having different wavelengths improves quality of the resulting image, for example, due to reduced interference and parasitic inclusions.

Figure 2H:
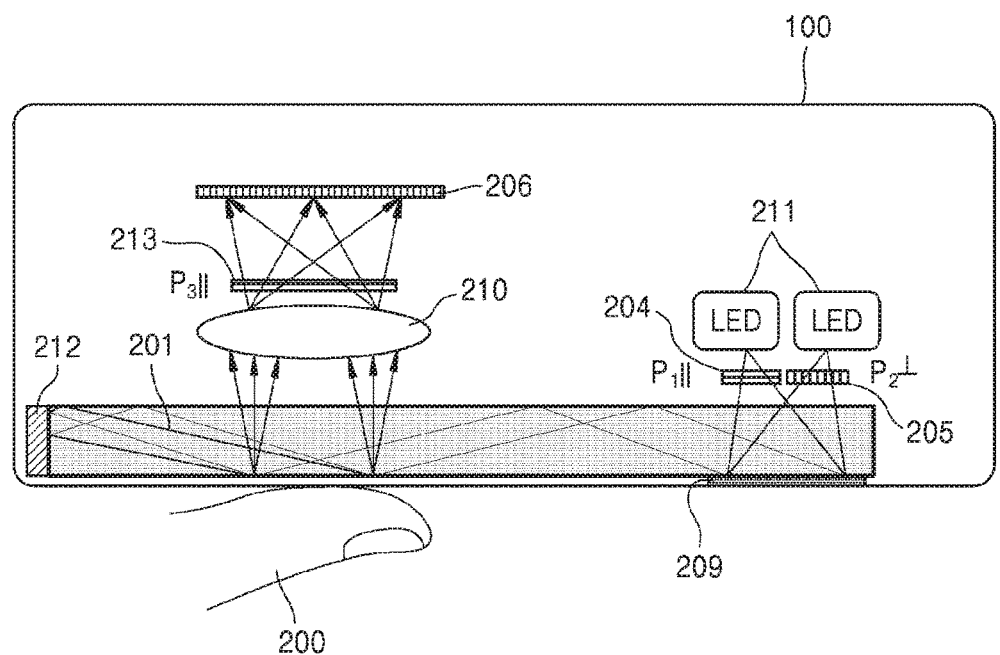
FIG. 2H illustrates a structure of a user identification system in accordance with another example embodiment of the present disclosure, in which polarizing films are respectively disposed between radiation sources and a waveguide.

FIG. 2H shows a structure of the user identification system 100 in accordance with another example embodiment of the present disclosure, in which polarizing films 204 and 205 are respectively disposed between respective radiation sources (LEDs 211) and a waveguide 201. In particular, the optical system for identifying a user in accordance with this example embodiment includes two LEDs 211. The two LEDs 211 are non-polarized. Light emitted by the LEDs 211 passes through a cross-polarized (parallel polarization) polarizing film 204 and a co-polarized (orthogonal polarization) polarizing film 205, respectively. The optical system is used for polarization in different directions. Next, the polarized light (i.e., combined light transmitted by the cross-polarized (parallel polarization) polarizing film 204 and the co-polarized (orthogonal polarization) polarizing film 205) is reflected from a holographic optical element (HOE) 209, partially absorbed by a light absorber 212, reflected by the scattering object (e.g., the tip or ridges of the user's finger 200), passes through the lens 210, and then is incident on another polarizing film, in particular, an additional instance of the cross-polarized polarizing film 213 having the same polarization as the cross-polarized polarizing film 204, which filters out reflection from the surface of the scattering object. Light subsequently transmitted by the additional instance of the cross-polarized polarization film 204 is detected by the detector 206 for further conversion.

In the case of a fake finger, when the light that passes through the cross-polarizing film 204 and co-polarizing film 205 is reflected by the surface of a fake finger and then passes through the additional instance of the cross-polarizing film 213, captured images of the fake finger (i.e., a fake fingerprint) will not be different from one another, since at the additional instance of the cross-polarizing film 213, both types of polarized light are destroyed (i.e., absorbed or filtered by the additional instance of the cross-polarizing film 213) identically. However, in the case of a "live" finger, captured images of a "live" finger (i.e., a real fingerprint) will be different from one another due to the fact that one of the types of polarized light is destroyed stronger than the other. This information will also be used to determine whether the user's biometric data are acquired from a "live" finger or a fake finger.

Those skilled in the art would appreciate that the lens array 203, the set of lenses 208 and the single lens 210 described above may be used interchangeably according to application and may be generally referred to in this document as a lens system. The example embodiments mentioned above are presented only as examples, and various modifications can be made.

FIG. 3 illustrates a flow chart of a user identification method in accordance with an example embodiment of the present disclosure. Upon starting operation of the user identification system 100 (the sensor), user registration process 310 begins. If the user registration process 310 has already been performed for the user, then the user identification process 320 is performed. The first step of the user identification process 320 includes a fingerprint recognition step (step 321) which includes detecting a portion of the user's finger 200 in contact with a touch-sensitive region of a device. The touch-sensitive region may be, for example, included in a button of the device. The user identification system 100 is disposed under the touch-sensitive region. Contact of the user's finger 200 with the touch-sensitive region may be detected regardless of the orientation of the user's finger 200 with respect to the touch-sensitive region.

The second step includes collecting data related to a fingerprint of the user from the user's finger 200 (step 322). During the second step, data relating to the fingerprint of the user from the user's finger 200 is collected for a period of time, and a plurality of frames, in particular about 30, preferably at least 20 frames, are obtained from the data. The frames may be used to detect blood microcirculation in the fingertip by the above method based on analysis of spatio-temporal intensity fluctuations. Blood microcirculation is verified based on whether a red blood cell moves a distance equal to at least 1× its body size (10 µm=0.01 mm), as the velocity of blood flow in capillaries is approximately 1 mm/s. Detection of movement of a red blood cell by 1× the body size thereof is made in about 0.01 sec. Standard cameras for mobile devices have a frame rate (fps, the number of changed frames per unit time, generally per 1 second) equal to about 30 frames per second. Therefore, in the span of 1 second, a standard camera can capture approximately 30 frames. Data relating to the fingerprint, collected in this step, also includes information on a ridge pattern of the fingerprint and a sweat gland pattern of the fingerprint with respect to the portion of the user's finger 200 in contact with the button.

Further, the third step includes determining whether the ridge pattern matches a pre-stored reference ridge pattern corresponding to an authorized user of the device (step 323). The pre-stored reference ridge pattern is a pattern stored in the device when a user registers with the device (e.g., during step 313 of the user registration process 310 to be described later). If, in step 323, the user identification system 100 determines that the reference fingerprint, particularly the ridge pattern obtained in data collection step 322, does not match the pre-stored reference ridge pattern, in particular the ridge pattern that was stored during the user registration process 310, then the user identification process 320 is unsuccessful (step 326), i.e. the user identification system 100 concludes that the user is not an authorized user of the device. During step 323, the user identification system 100 may compare the ridge pattern against pre-stored reference ridge patterns or compare a portion of the ridge pattern against portions of pre-stored reference ridge patterns.

If, in step 323, the user identification system 100 determines that the reference fingerprint, specifically the ridge pattern obtained in data collection step 322, matches the pre-stored reference ridge pattern, particularly the ridge pattern that was stored during the user registration process 310, then the user identification system 100 continues to the fourth step of the user identification process 320.

The fourth step includes determining whether the sweat gland pattern matches a pre-stored reference sweat gland pattern corresponding to an authorized user of the device (step 324). The pre-stored reference sweat gland pattern is a pattern stored in the device when a user registers with the device (e.g., during step 314 of the user registration process 310 to be described later). If, in step 324, the user identification system 100 determines that the sweat gland pattern obtained in data collection step 322 does not match the pre-stored reference sweat gland pattern, in particular the sweat gland pattern that was stored during the user registration process 310, then the user identification process 320 is unsuccessful (step 326), i.e. the user identification system 100 concludes that the user is not an authorized user of the device. During step 324, the user identification system 100 may compare the sweat gland pattern against pre-stored reference sweat gland patterns or compare a portion of the sweat gland pattern against portions of pre-stored reference sweat gland patterns.

If the user identification system 100 determines that both the ridge and sweat gland patterns obtained in data collection step 322 match the pre-stored reference the ridge and sweat gland patterns, the user identification system 100 continues to the fifth step of the user identification process 320. The fifth step includes detecting for blood circulation (step 325). The detection in step 325 may include, for example, detecting for blood microcirculation. The plurality of frames are processed by the aforementioned method based on analysis of spatio-temporal intensity fluctuations, and a random interference picture is produced. On this picture, "speckles" can be observed. In the picture, moving particles (e.g., moving red blood cells may be indicated by fluctuation of the speckles. The detection in step 325 may include viewing the intensity of fluctuations combined over a period of time to obtain information about movement of scattering particles. If, in step 325, the user identification system 100 determines there is no movement of scattering particles (i.e., no blood circulation in the user's finger 200), then the user identification process 320 is unsuccessful (step 326), i.e. the user identification system 100 concludes that the user is not an authorized user of the device. If, in step 325, the user identification system 100 confirms the movement of scattering particles (i.e., confirms blood circulation in the user's finger 200), then the user identification process 320 is successful (step 327), i.e. the user identification system 100 concludes that the user is an authorized user of the device.

Steps 323-325 can follow one other in an order different from that illustrated in FIG. 3. The prerequisite for successful user identification is to perform all of the steps 321-325 of the user identification process 320.

If the user registration process 310 has not been previously executed for a user, then the user identification system 100 may proceed with the user registration process 310. The user registration process 310 includes the following steps.

The first step similarly includes detecting a touch input in which a portion of the user's finger 200 is in contact with the touch-sensitive region of the device. Upon detection of the touch input, the user identification system 100 may capture a full fingerprint of the user (step 311). During the capture of the full fingerprint, the user identification system 100 may require the user to repeatedly press the button and/or sliding the user's finger 200 thereon until the user identification system 100 captures the full fingerprint.

The second step includes collecting data relating to the fingerprint (step 312) for analysis of spatio-temporal intensity fluctuations. Data relating to the fingerprint includes, as described above, information on a ridge pattern and sweat gland pattern, and during the second step, the user identification system 100 collects data relating to the fingerprint of the user from the user's finger 200 for a period of time, capturing about 30 frames during the period, which will be later used to detect microcirculation.

The third step includes recording the ridge pattern of the fingerprint (step 313) and storing the same as a reference ridge pattern.

The fourth step includes recording a sweat gland pattern (step 314) and storing the same as a reference sweat gland pattern.

The fifth step includes registering dynamics of blood microcirculation (step 315).

Successful individual registration of a user requires completion of all of the steps 311-315.

The disclosure may find application in consumer electronic devices and can expand capabilities of electronic devices by providing additional security through the use of the inventive identification system, which enables user identification based on a ridge pattern, a sweat gland pattern and dynamics of microcirculation.

The product can be used, for example, to provide:
access to electronic devices;
access to personal information; and
access to financial transactions, etc.

Those skilled in the art would understand that the number of structural elements or components of the system 100 may vary as necessary. In addition, persons skilled in the art would understand that the illustrated arrangement of units of the system 100 is exemplary and can be modified, as necessary, to attain a greater effectiveness in a particular application, if the description does not specifically specify otherwise. References of system elements in the singular do not exclude a plurality of such elements, if not explicitly stated otherwise.

Although the present description illustrates example embodiments of the disclosure, it should be understood that various changes and modifications may be made without departing from the scope of the present disclosure defined by the attached claims.

What is claimed is:

1. An optical system integrated in a mobile device and comprising:
   a waveguide configured to guide light emitted by a radiation source;
   an optical image forming unit comprising at least one lens configured to receive light exiting the waveguide and reflected from a light scattering object, wherein the at least one lens focuses the received light onto a polarizing film;
   the polarizing film configured to filter the received light;
   a detector having light-sensitive elements which sense light transmitted by the polarization film and form an optical image on a surface of the detector based on the sensed light, wherein the detector is configured to convert the formed optical image into an electrical signal comprising data relating to the light scattering object, wherein the data relating to the light scattering object comprises dynamics of blood circulation in the light scattering object; and at least one processor configured to obtain a plurality of frames from the data relating to light scattering object and to identify a user by comparing the data relating to the light scattering object with pre-stored data, based on an analysis of spatio-temporal intensity fluctuations of moving blood cells observed in the plurality of frames obtained from the data relating to light scattering object, wherein the waveguide comprises a light absorber disposed on a side surface of the waveguide.

2. The optical system of claim 1, wherein the at least one processor is further configured to identify the user as an unauthorized user in response to determining a portion of a ridge pattern does not match a portion of a pre-stored reference ridge pattern, determining a sweat gland pattern does not match a pre-stored reference sweat gland pattern, or determining blood is not circulating in the light scattering object.

3. The optical system of claim 1, wherein the light scattering object is a user's finger.

4. The optical system of claim 3, wherein the electrical signal contains information on a ridge pattern, a sweat gland pattern, and dynamics of blood circulation in the user's finger.

5. The optical system of claim 1, wherein the polarizing film comprises cross-polarization part and a co-polarization part.

6. The optical system of claim 1, wherein the light scattering object is placed adjacent to the waveguide.

7. The optical system of claim 1, wherein the polarizing film is disposed in front of the detector along a light path.

8. The optical system of claim 1, wherein the radiation source is either a laser diode or a light emitting diode (LED).

9. The optical system of claim 1, wherein the light absorber is disposed on the side surface of the waveguide that is opposite to the radiation source and adjacent to the detector.

10. The optical system of claim 1, wherein the at least one lens of the optical image forming unit includes at least one of a single lens, a set of lenses, and an array of lenses.

11. The optical system of claim 1, wherein the detector of the optical image forming unit is a CMOS array.

12. The optical system of claim 1, wherein the at least one processor is autonomous.

13. The optical system of claim 1, wherein the at least one processor is a cluster system.

14. The optical system of claim 1, further comprising a plurality of waveguides and a plurality of radiation sources.

* * * * *